United States Patent
Coppola

(10) Patent No.: US 8,205,601 B2
(45) Date of Patent: Jun. 26, 2012

(54) SYSTEMS AND METHODS FOR MEASURING ENGINE BOOST PRESSURE

(75) Inventor: John Coppola, Highland, MI (US)

(73) Assignee: GM Global Technology Operations LLC

( * ) Notice: Subject to any disclaimer, the term of this patent is extended or adjusted under 35 U.S.C. 154(b) by 758 days.

(21) Appl. No.: 12/404,584

(22) Filed: Mar. 16, 2009

(65) Prior Publication Data

US 2010/0229840 A1   Sep. 16, 2010

(51) Int. Cl.
*F02B 33/00* (2006.01)
(52) U.S. Cl. .............. 123/564; 60/601; 60/603
(58) Field of Classification Search .......... 123/564; 60/601, 603
See application file for complete search history.

(56) References Cited

U.S. PATENT DOCUMENTS

| | | | | |
|---|---|---|---|---|
| 5,031,406 A * | 7/1991 | Akiyama | ...................... | 123/564 |
| 5,605,044 A * | 2/1997 | Zimmer et al. | .................. | 60/602 |
| 5,974,801 A * | 11/1999 | Houtz | ............................. | 60/602 |
| 7,066,143 B1 * | 6/2006 | Gallagher et al. | ............ | 123/380 |
| 7,650,219 B2 * | 1/2010 | Livshiz et al. | ................ | 701/101 |
| 7,668,687 B2 * | 2/2010 | Bauerle | ........................ | 702/138 |

\* cited by examiner

*Primary Examiner* — Mary A Davis

(57) ABSTRACT

An engine system includes a correction factor generation module and a boost pressure correction module. The correction factor generation module generates a correction factor based on a first pressure difference, wherein the first pressure difference corresponds to a difference between an intake manifold absolute pressure (MAP) when an engine is on and a barometric pressure. The boost pressure correction module generates a corrected boost pressure based on the MAP when the engine is on, a second pressure difference, and the correction factor, wherein the second pressure difference corresponds to a difference between the MAP when the engine is off and the barometric pressure.

18 Claims, 3 Drawing Sheets

SYSTEMS AND METHODS FOR MEASURING ENGINE BOOST PRESSURE

FIELD

The present disclosure relates to forced-induction (FI) engine systems and more particularly to systems and methods for measuring engine boost pressure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Forced-induction (FI) engine systems are a more powerful alternative to similarly sized naturally-aspirated (NA) engine systems. In FI engine systems, an air compressor compresses air to increase an amount of air fed into an intake manifold. The compressed air is typically referred to as boost. Boost increases oxygen available for combustion, which in turn may result in increased power output. For example only, more fuel may be injected and the larger amount of air/fuel (A/F) mixture may be combusted to increase power.

A FI engine may include a turbocharger and/or a supercharger. A turbocharger includes a turbine that is powered by exhaust gas. A supercharger includes a turbine that is mechanically powered. For example only, a supercharger turbine may be powered by a belt, a gear, a shaft, or a chain connected to an engine crankshaft.

SUMMARY

An engine system includes a correction factor generation module and a boost pressure correction module. The correction factor generation module generates a correction factor based on a first pressure difference, wherein the first pressure difference corresponds to a difference between an intake manifold absolute pressure (MAP) when an engine is on and a barometric pressure. The boost pressure correction module generates a corrected boost pressure based on the MAP when the engine is on, a second pressure difference, and the correction factor, wherein the second pressure difference corresponds to a difference between the MAP when the engine is off and the barometric pressure.

A method includes generating a correction factor based on a first pressure difference, wherein the first pressure difference corresponds to a difference between an intake manifold absolute pressure (MAP) when an engine is on and a barometric pressure, and generating a corrected boost pressure based on the MAP when the engine is on, a second pressure difference, and the correction factor, wherein the second pressure difference corresponds to a difference between the MAP when the engine is off and the barometric pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
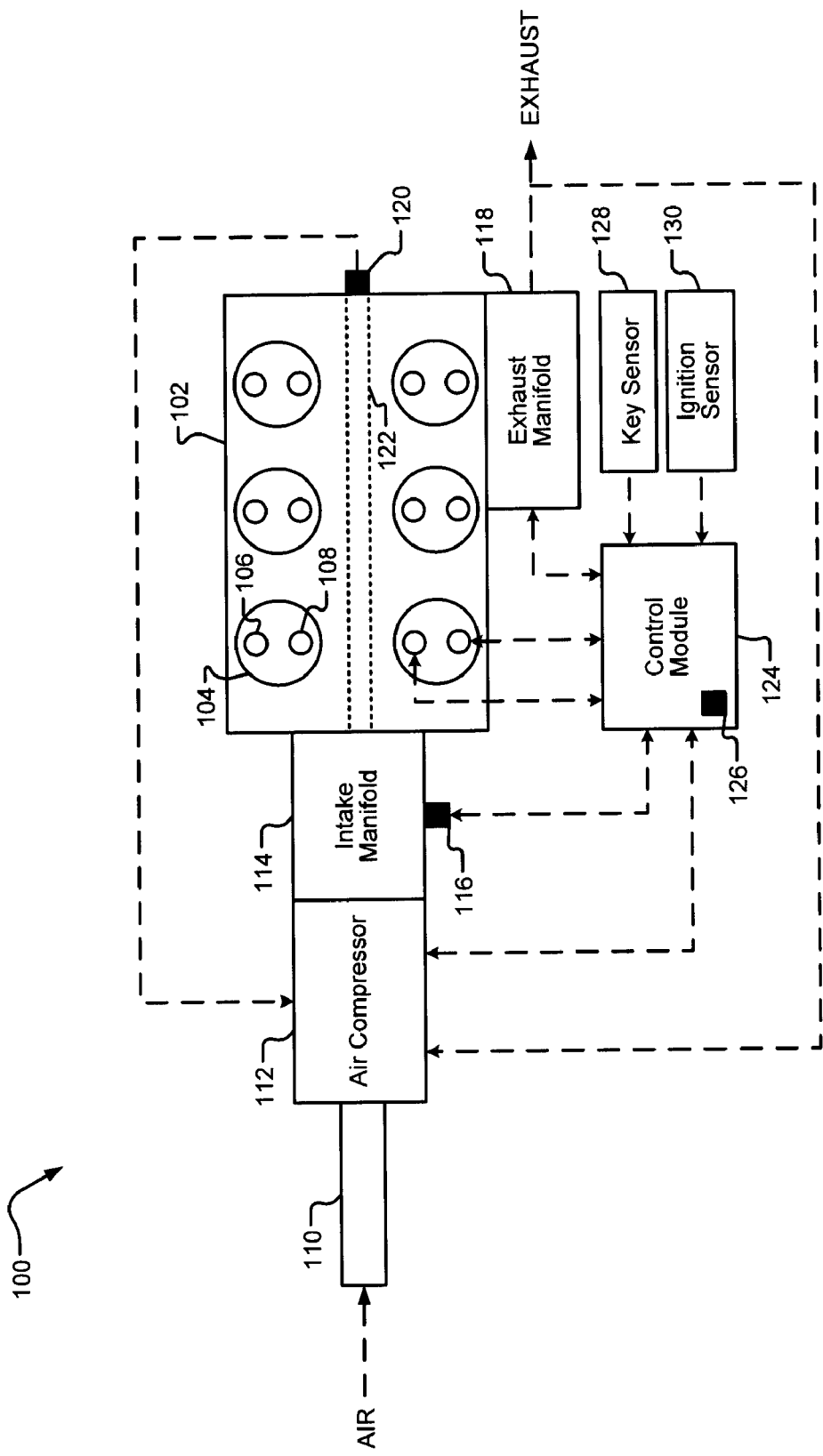
FIG. 1 is a functional block diagram of a forced induction (FI) engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Boost pressure sensors (i.e. manifold absolute pressure, or MAP sensors) typically have absolute sensor variations. For example only, the absolute sensor variation may be +/−10 kPa. Absolute sensor variations may have different effects at different boost levels. For example only, at 300 kPa boost, a boost pressure sensor with a +/−10 kPa variation may have as much as 3% variation. Conversely, at 100 kPa boost (i.e. atmospheric pressure), a boost pressure sensor with a +/−10 kPa variation may have as much as 10% variation.

Accurate boost pressure measurement may improve performance. For example only, fuel injection and/or spark timing may be adjusted based on measured boost pressure. Inaccurate boost pressure measurement may result in degraded performance and/or efficiency.

Referring now to FIG. 1, an exemplary forced induction (FI) engine system 100 is shown. The FI engine system includes an engine 102. For example only, the engine 102 may be a port fuel injection engine, a direct fuel injection engine, a compression ignition engine, such as a diesel engine, a homogenous charge compression ignition engine, etc.

The engine 102 includes a plurality of cylinders 104. While six cylinders are shown, it can be appreciated that other cylinders configurations may be used. For example only, the engine 104 may include 2, 3, 4, 5, 8, 10, 12, or 16 cylinders. In SIDI engines, each cylinder 104 may include a fuel injector 106 and a spark plug 108.

Air is drawn into the engine 102 through an air intake 110. The air intake 110 is connected to an air compressor 112. The air compressor 112 forces the air it into an intake manifold 114 at a pressure higher than atmospheric pressure. For example, the air compressor 112 may be either a turbocharger or a supercharger. For a turbocharger-type air compressor 112, exhaust gas from an exhaust manifold 118 powers a turbine of the air compressor 112. For a supercharger-type air compressor 112, mechanical power from a device 120 connected to a crankshaft 122 powers the turbine of the air compressor 112. For example, the device 120 may be a belt, a gear, a shaft, or a chain.

The compressed air is forced into the intake manifold 114. The intake manifold 114 includes a manifold absolute pressure (MAP) sensor 116 (i.e. a boost sensor) that measures air pressure inside the intake manifold 114.

The intake manifold 114 distributes the compressed air to the cylinders 104. The compressed air is combined with fuel to create and air and fuel (A/F) mixture. The A/F mixture in the cylinders 104 is then combusted. In SIDI engines, the A/F mixture is combusted using the spark plugs 108. In CI engines, the A/F mixture is combusted by compressing the A/F mixture using a piston (not shown).

The combustion of the A/F mixture in the cylinders 104 drives pistons (not shown) that rotatably turn the crankshaft 122 to produce drive torque. Exhaust gases from the cylinders 104 are vented from the engine 102 through the exhaust manifold 108 and an exhaust system (not shown). The exhaust gases may also be partially recycled (i.e. re-routed) to power the turbocharger turbine 112.

The FI engine system 100 also includes a control module 124. The control module 124 communicates with and/or controls different components of the FI engine system 100. For example, the control module 124 may control the fuel injectors 106 and the spark plugs 108 to optimize combustion.

The control module 124 may include a barometric pressure sensor 126, however it can be appreciated that the barometric pressure sensor 126 may be located elsewhere in the FI engine system 100. The barometric pressure sensor 126 generates a barometric pressure signal (Baro) based on barometric (i.e. atmospheric) pressure.

The control module 124 may also communicate with a key sensor 128 and an ignition sensor 130. The key sensor 128 may determine whether a key is inserted into an ignition controller (not shown) of the engine 102. The ignition sensor 130 may determine whether the engine 102 has been started (i.e. ignited). The control module 124 may use the key sensor 128 and the ignition sensor 130 collectively to determine whether a key-on, ignition-off (KOIO) event is occurring. For example, a KOIO event occurs when the key is inserted into the ignition controller (not shown) of the vehicle (not shown), but the engine 102 has not yet been started. In other words, for example, engine components (i.e. sensors) may be running on battery power during a KOIO event.

Figure 2:
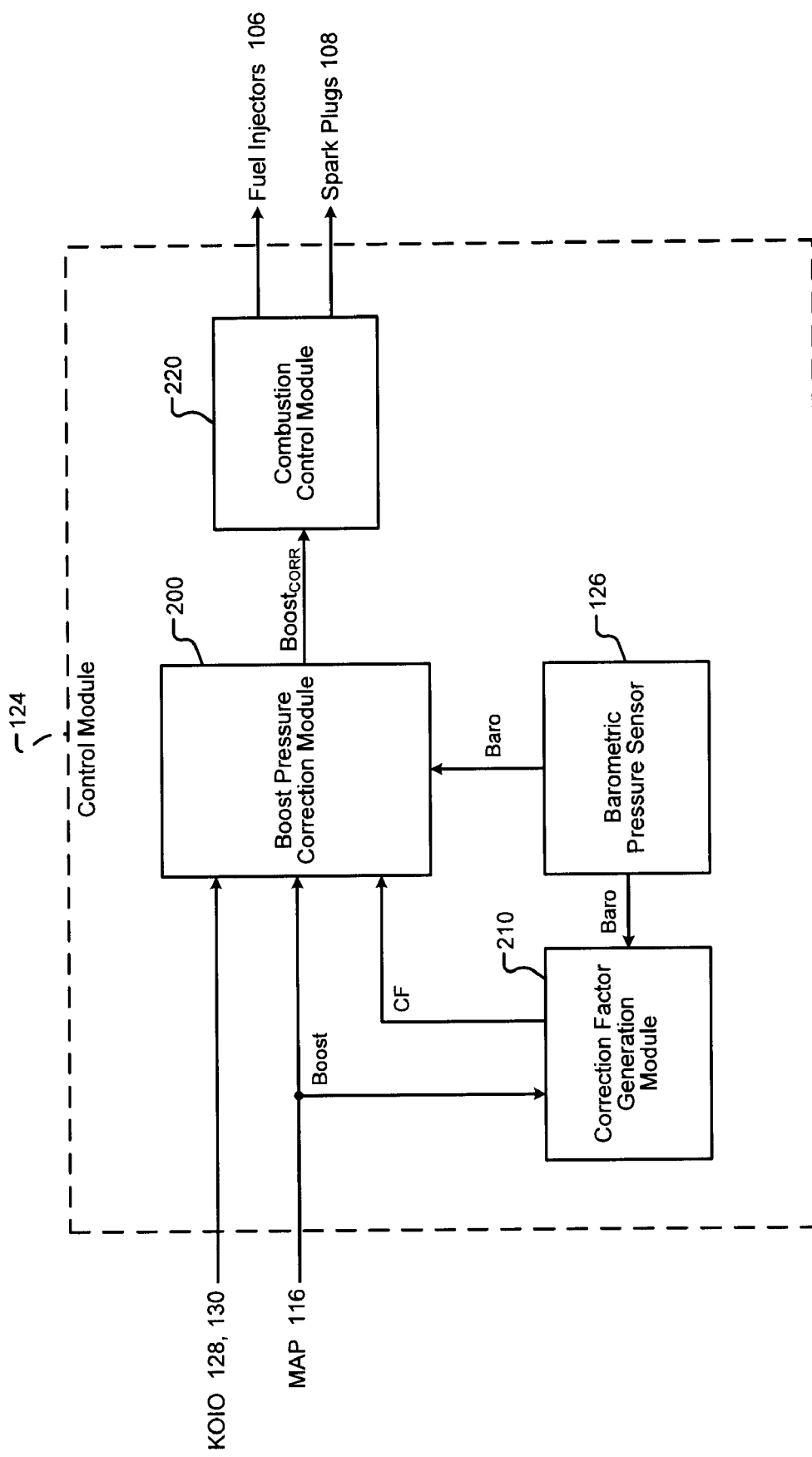
FIG. 2 is a functional block diagram of a control module according to the present disclosure.

Referring now to FIG. 2, the control module 124 includes the barometric pressure sensor 126, a boost pressure correction module 200, a correction factor generation module 210, and a combustion control module 220.

The boost pressure correction module 200 may receive the barometric pressure signal (Baro) from the barometric pressure sensor 126, a boost pressure signal (Boost) from the MAP sensor 116, and a KOIO signal 128, 130. For example, the KOIO signal 128, 130 may correspond to a key-on signal from the key sensor 128 and an ignition-off signal from the ignition sensor 130.

The boost pressure correction module 200 generates a corrected boost pressure signal ($BOOSt_{CORR}$). For example, $BOOSt_{CORR}$ may be based on a pre-ignition boost pressure signal ($Boost_1$), a post-ignition boost pressure signal ($Boost_2$), the barometric pressure signal (Baro), and a correction factor (CF). More specifically, the corrected boost pressure signal $BOOSt_{CORR}$ may be generated as follows:

$$Boost_{CORR} = Boost_2 + [(Boost_1 - Baro) \times CF],$$

where $Boost_1$ corresponds to MAP during a KOIO event (i.e. pre-ignition), $Boost_2$ corresponds to MAP after a KOIO event (i.e. post-ignition), and Baro corresponds to barometric pressure during the KOIO event.

The correction factor generation module 210 generates the correction factor (CF) based on the second boost pressure signal ($Boost_2$) and the barometric pressure signal (Baro). The correction factor (CF) may be a value between zero and one corresponding to an accuracy of the boost pressure signal (Boost). For example, the correction factor (CF) may be based on predetermined values stored in a look-up table. In other words, for example, the correction factor (CF) may be smaller when the boost pressure signal (Boost) is high (e.g. 300 kPa) because the MAP sensor 116 may be more accurate at high pressure levels.

The combustion control module 220 receives the corrected boost pressure signal ($BOOSt_{CORR}$). The combustion control module 220 may control components of the engine system 100 based on the corrected boost pressure signal ($BOOSt_{CORR}$). For example, the combustion control module 220 may actuate fuel injectors 106 and/or spark plugs 108 based on the corrected boost pressure signal ($BOOSt_{CORR}$).

Figure 3:
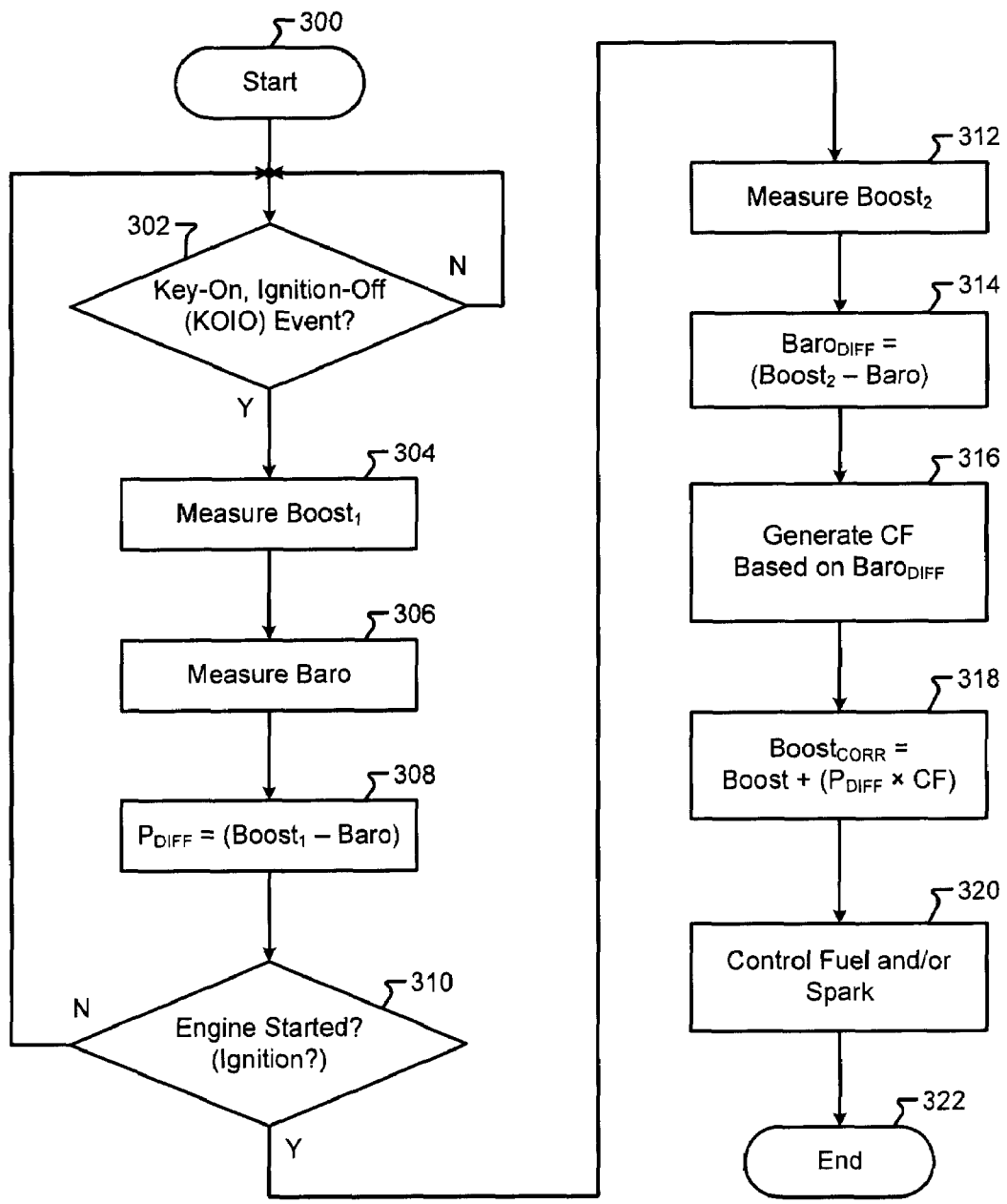
FIG. 3 is a flow diagram of a method of measuring engine boost pressure according to the present disclosure.

Referring now to FIG. 3, a flow diagram of a method of measuring boost pressure begins in step 300. In step 302, the control module 124 determines whether a key-in, ignition-off (KOIO) event is occurring. If no, control may return to step 302. If yes, control may proceed to step 304.

In step 304, the control module 124 measures boost pressure ($Boost_1$) using the MAP sensor 116. In step 306, the control module 124 measures barometric pressure (Baro) using the barometric pressure sensor 126. In step 308, the control module 124 calculates an initial pressure difference ($P_{DIFF}$) between the boost pressure ($Boost_1$) and the barometric pressure (Baro).

In step 310, the control module 124 determines whether the engine 102 has started (i.e. the KOIO event has ended). If yes, control may proceed to step 312. If no, control may return to step 302.

In step 312, the control module 124 measures boost pressure ($Boost_2$) again using the MAP sensor 116. However, the engine 102 is now running and boost pressure ($Boost_2$) may differ more from barometric pressure (Baro). In step 314, the control module 124 calculates a barometric pressure difference ($Baro_{DIFF}$) between boost pressure ($Boost_2$) and the barometric pressure (Baro) (e.g. $Baro_{DIFF} = Baro - Boost_2$).

In step 316, the control module 124 generates the correction factor (CF) based on the barometric pressure difference ($Baro_{DIFF}$). In step 318, the control module 124 may generate the corrected boost pressure signal ($BOOSt_{CORR}$) based on the following:

$$BOOSt_{CORR} = BOOST_2 + (P_{DIFF} \times CF).$$

In step 320, the control module 124 may control fuel injectors 106 and/or spark plugs 108 based on the corrected boost pressure ($BOOSt_{CORR}$). Control may then end in step 322.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system, comprising:
 a correction factor generation module that generates a correction factor based on a first pressure difference, wherein the first pressure difference corresponds to a difference between an intake manifold absolute pressure (MAP) when an engine is on and a barometric pressure;
 a boost pressure correction module that generates a corrected boost pressure based on the MAP when the engine is on, a second pressure difference, and the correction factor, wherein the second pressure difference corresponds to a difference between the MAP when the engine is off and the barometric pressure; and a combustion control module that controls at least one of a plurality of fuel injectors and a plurality of spark plugs based on the corrected boost pressure.

2. The engine system of claim 1, wherein the corrected boost pressure is generated by adding the MAP when the engine is on to a product of the second pressure difference and the correction factor.

3. The engine system of claim 1, wherein the correction factor is greater than or equal to zero and less than or equal to one.

4. The engine system of claim 1, wherein the correction factor decreases when the first pressure difference increases, and wherein the correction factor increases when the first pressure difference decreases.

5. The engine system of claim 1, further comprising:
a MAP sensor that generates the MAP based on a pressure inside an intake manifold of the engine.

6. The engine system of claim 1, further comprising:
a barometric pressure sensor that generates the barometric pressure based on atmospheric pressure.

7. The engine system of claim 1, further comprising:
an air compressor that compresses air into an intake manifold at a pressure higher than atmospheric pressure.

8. The engine system of claim 7, wherein the air compressor includes one of a turbocharger and a supercharger.

9. The engine system of claim 1, further comprising:
a key sensor that determines whether a key is inserted into an ignition controller; and
an ignition sensor that determines whether the key is turned and the engine is started,
wherein the first pressure difference corresponds to a time period after the key is inserted into the ignition controller and before the engine is started, and wherein the second pressure difference corresponds to a time period after the engine is started.

10. A method, comprising:
generating a correction factor based on a first pressure difference, wherein the first pressure difference corresponds to a difference between an intake manifold absolute pressure (MAP) when an engine is on and a barometric pressure;
generating a corrected boost pressure based on the MAP when the engine is on, a second pressure difference, and the correction factor, wherein the second pressure difference corresponds to a difference between the MAP when the engine is off and the barometric pressure; and
controlling at least one of a plurality of fuel injectors and a plurality of spark plugs based on the corrected boost pressure.

11. The method of claim 10, wherein the corrected boost pressure is generated by adding the MAP when the engine is on to a product of the second pressure difference and the correction factor.

12. The method of claim 10, wherein the correction factor is greater than or equal to zero and less than or equal to one.

13. The method of claim 10, wherein the correction factor decreases when the first pressure difference increases, and wherein the correction factor increases when the first pressure difference decreases.

14. The method of claim 10, further comprising:
generating the MAP based on a pressure inside an intake manifold of the engine.

15. The method of claim 10, further comprising:
generating the barometric pressure based on atmospheric pressure.

16. The method of claim 10, further comprising:
compressing air into an intake manifold at a pressure higher than atmospheric pressure.

17. The method of claim 16, wherein one of a turbocharger and a supercharger compresses the air into the intake manifold at the pressure higher than atmospheric pressure.

18. The method of claim 10, further comprising:
determining whether a key is inserted into an ignition controller; and
determining whether the key is turned and the engine is started,
wherein the first pressure difference corresponds to a time period after the key is inserted into the ignition controller and before the engine is started, and wherein the second pressure difference corresponds to a time period after the engine is started.

* * * * *